(12) United States Patent
Laemmle et al.

(10) Patent No.: US 11,312,249 B2
(45) Date of Patent: *Apr. 26, 2022

(54) INDUCTION CHARGING DEVICE WITH A CHARGING ARRANGEMENT INCLUDING AN ACTIVE COOLING ARRANGEMENT

(71) Applicant: Mahle International GmbH, Stuttgart (DE)

(72) Inventors: Christopher Laemmle, Stuttgart (DE); Timo Laemmle, Kernen (DE); Florin Maldovan, Stuttgart (DE); Heiko Neff, Auenwald (DE)

(73) Assignee: MAHLE INTERNATIONAL GMBH

( * ) Notice: Subject to any disclaimer, the term of this patent is extended or adjusted under 35 U.S.C. 154(b) by 332 days.

This patent is subject to a terminal disclaimer.

(21) Appl. No.: 16/608,861

(22) PCT Filed: Apr. 17, 2018

(86) PCT No.: PCT/EP2018/059777
§ 371 (c)(1),
(2) Date: Oct. 27, 2019

(87) PCT Pub. No.: WO2018/197267
PCT Pub. Date: Nov. 1, 2018

(65) Prior Publication Data
US 2020/0198483 A1    Jun. 25, 2020

(30) Foreign Application Priority Data
Apr. 28, 2017   (DE) .......................... 102017207266.0

(51) Int. Cl.
*H02J 7/00* (2006.01)
*B60L 53/12* (2019.01)
(Continued)

(52) U.S. Cl.
CPC ............. *B60L 53/12* (2019.02); *B60L 53/122* (2019.02); *B60L 53/302* (2019.02); *H02J 50/12* (2016.02); *B60L 2240/36* (2013.01)

(58) Field of Classification Search
CPC ....................................................... H02J 7/0029
(Continued)

(56) References Cited

U.S. PATENT DOCUMENTS 9,112,364 B2 * 8/2015 Partovi ................. H02J 7/0013
9,406,429 B2   8/2016 Abe et al.
(Continued)

FOREIGN PATENT DOCUMENTS

CN    202340126 U    7/2012
CN    103119669 A    5/2013
(Continued)

OTHER PUBLICATIONS

German Search Report dated Mar. 24, 2020 for copending German Application No. 10 2017 207 266.0.
(Continued)

*Primary Examiner* — Yalkew Fantu
(74) *Attorney, Agent, or Firm* — Fishman Stewart PLLC

(57) ABSTRACT

An induction charging device for an electrically operated motor vehicle may include an emission protection arrangement and a charging arrangement secured to the emission protection arrangement. The emission protection arrangement may include a metal shield plate. The charging arrangement may include a magnetic plate facing the emission protection arrangement, at least one induction coil disposed in a charging housing, and an active cooling arrangement secured in the charging housing to transfer heat. The magnetic plate may be at least one of (i) at least partially ferrimagnetic and (ii) at least partially ferromagnetic. On a housing bottom side, the charging housing may
(Continued)

include at least one cooling recess for the active cooling arrangement. The active cooling arrangement may include at least one cooling duct formed integrally in the cooling recess. The charging arrangement may further include a bottom side cover secured in a fluid-tight manner to the housing bottom side.

20 Claims, 3 Drawing Sheets

(51) Int. Cl.
    *H02J 50/12* (2016.01)
    *B60L 53/302* (2019.01)
    *B60L 53/122* (2019.01)

(58) Field of Classification Search
    USPC .......................................................... 320/108
    See application file for complete search history.

(56) References Cited

U.S. PATENT DOCUMENTS

| | | | |
|---|---|---|---|
| 9,550,427 | B2 | 1/2017 | Takeshita et al. |
| 9,711,995 | B2 | 7/2017 | Yuasa |
| 10,118,497 | B2 | 11/2018 | Garcia et al. |
| 10,173,531 | B2 | 1/2019 | Garcia et al. |
| 10,650,952 | B2 | 5/2020 | Laemmle et al. |
| 2016/0056511 | A1* | 2/2016 | Schmid .................. B23P 15/26 165/80.2 |
| 2016/0089988 | A1* | 3/2016 | Bartz ..................... B60L 53/38 320/108 |
| 2016/0211064 | A1 | 7/2016 | Choi et al. |
| 2018/0254136 | A1 | 9/2018 | Ueda et al. |
| 2020/0139828 | A1* | 5/2020 | Laemmle ................ B60L 53/12 |

FOREIGN PATENT DOCUMENTS

| | | |
|---|---|---|
| CN | 104335303 A | 2/2015 |
| CN | 105073478 A | 11/2015 |
| CN | 105226841 A | 1/2016 |
| CN | 205051443 U | 2/2016 |
| DE | 112016003866 T5 | 5/2018 |
| DE | 102017202067 A1 | 8/2018 |
| EP | 2620960 | 7/2013 |
| EP | 2858079 | 4/2015 |
| GB | 2529630 A | 3/2016 |
| JP | 2017-45792 A | 3/2017 |
| WO | 2014/199255 A1 | 12/2014 |
| WO | 2015014827 | 2/2015 |
| WO | 2017/033859 A1 | 3/2017 |

OTHER PUBLICATIONS

Chinese Office Action dated Aug. 6, 2020 for copending Chinese Application No. 201880027768.4.

* cited by examiner

INDUCTION CHARGING DEVICE WITH A CHARGING ARRANGEMENT INCLUDING AN ACTIVE COOLING ARRANGEMENT

CROSS-REFERENCE TO RELATED APPLICATIONS

This application claims priority to International Patent Application No. PCT/EP2018/059777, filed on Apr. 17, 2018, and German Patent Application No. DE 10 2017 207 266.0, filed on Apr. 28, 2017, the contents of both of which are hereby incorporated by reference in their entirety.

TECHNICAL FIELD

The invention relates to an induction charging device for a partially or fully electrically operated motor vehicle.

BACKGROUND

Induction charging devices are already known from the prior art and can be used for the contact-free transfer of the energy from an external source to an energy storage device in the motor vehicle as well as directly in an electrical consumer or in a drive.

The induction device thereby has a charging arrangement comprising at least one secondary coil, which can be electromagnetically coupled to a primary coil. The secondary coil can be secured, for example, to a motor vehicle floor, and the primary coil can be secured to a floor-level or height-adjustable charging point. By approaching the charging point, the secondary point can then be electromagnetically coupled to the primary coil, and an energy storage device of the motor vehicle can be charged in a contact-free manner by means of an electromagnetic interaction between the primary coil and the secondary coil. Due to a coil variety in the floor or in the driving surface, energy can also be transferred semi-dynamically in the "stop and go" operation or dynamically in the driving operation. The primary coil and the secondary coil can thereby be designed, for example, in the form of a circular coil or double-D coil or in a different way.

During a charging process, an electromagnetic field, which is influenced to reduce the charge losses by means of a partially ferrimagnetic or ferromagnetic magnetic plate— for example comprising soft-magnetic ferrites—is built up between the primary coil and the secondary coil. An electromagnetic field emission, the height of which increases with the charging capacity, is created in the charging arrangement. The field emission can be captured by means of an emission protection arrangement—mostly in the form of a metal shield plate made of aluminum—so as not to damage electronic devices in the motor vehicle as well as to prevent a negative health effect on a human being.

As the charging capacity increases, so does the amount of heat, which accumulates at the magnetic plate and at the metal shield plate. In the case of a high charging capacity, the heat can be discharged only partly, which can lead to an overheating and thus to damage to the induction charging device.

SUMMARY

It is thus the object of the invention to provide an induction charging device, in the case of which a higher charging capacity is attained and damage to the induction charging device as a result of an overheating is prevented.

This object is solved according to the invention by means of the subject matter of the independent claim(s). Advantageous embodiments are the subject matter of the dependent claim(s).

The present invention is based on the general idea of actively cooling an induction charging device to attain a higher charging capacity as well as to prevent damage to the induction charging device as a result of an overheating. For this purpose, the induction charging device has an emission protection arrangement comprising a metal shield plate, and a charging arrangement secured to the emission protection arrangement. The charging arrangement thereby has at least one at least partially ferrimagnetic or ferromagnetic magnetic plate, which faces the emission protection arrangement, and at least one induction coil in a charging housing. According to the invention, the charging arrangement has an active cooling arrangement, which is secured in the charging housing so as to transfer heat.

The induction coil—a so-called secondary coil—can be electromagnetically coupled to an external induction coil—a so-called primary coil—and the energy can be transferred in a contact-free manner from the external induction coil to the induction coil and thus to an energy storage device. The active cooling arrangement thereby cools the charging arrangement and is to be understood as an arrangement, through which a cooling fluid—for example water, oil or a coolant—can at least partially flow. For this purpose, the cooling arrangement can have at least one cooling duct, through which the cooling fluid can flow. According to the invention, the active cooling arrangement is secured in the charging housing, so that the latter is actively cooled by means of a heat transfer between the cooler cooling fluid of the cooling arrangement and one of the hotter elements of the charging arrangement. The heat transfer advantageously takes place directly at the heat-generating elements of the charging arrangement, whereby a higher temperature gradient and thus a better heat transfer can be attained. As a whole, an overheating of the induction charging device can be prevented in this way and the charging capacity can be increased.

The metal shield plate of the emission protection arrangement shields the electromagnetic field emission of the charging arrangement and can be made, for example, of aluminum or of an aluminum alloy. The emission protection arrangement is advantageously arranged on an top side, and the charging arrangement on a bottom side of the induction charging device. The top side is thereby defined as a side facing the motor vehicle, and the bottom side is defined as a side of the induction charging device comprising the induction coil—the so-called secondary coil—facing away from the motor vehicle. In this way, the emission protection arrangement can shield the motor vehicle against the field emission generated in the charging arrangement, and the induction coil of the charging arrangement can be coupled to an external induction coil, for example of a charging point.

Due to the at least partially ferrimagnetic or ferromagnetic magnetic plate, which faces the emission protection arrangement, the electromagnetic field generated by the induction coil can be influenced and the charging capacity can be increased. For this purpose, the magnetic plate can have, for example, soft-magnetic ferrites, which are arranged on a metallic plate at least in some areas. The induction charging device can furthermore have a plurality of induction coils for increasing the charging capacity. The respective induction coil can thereby be a circular coil or a double-D coil or a solenoid coil or a bipolar coil. The dimensions of the respective induction coil can also be adapted to the required charging capacity.

As a whole, the induction charging device according to the invention can be actively cooled by means of the active cooling arrangement, whereby the charging capacity is increased and an overheating of the induction charging device is avoided. Induction coils, which are lighter and which have smaller dimensions, can alternatively be used to attain a charging capacity in the induction charging device according to the invention, which is the same as compared to the conventional induction charging devices. The total mass, the dimensions, as well as the costs of the induction charging device can be advantageously reduced thereby.

In the case of a further development of the induction charging device according to the invention, it is advantageously provided that the cooling arrangement is arranged with a cooling top side on the magnetic plate and with a cooling bottom side on the at least one induction coil at least in some areas. The cooling arrangement is arranged directly on the heat-developing induction coil in this way, whereby the heat transfer takes place directly between the cooling arrangement and the induction coil. An overheating of the induction coil, of the magnetic plate, as well as of the charging housing, is advantageously avoided thereby. The cooling arrangement can thereby abut on the induction coil in some areas as well as completely over a large area.

It is advantageously provided that the cooling arrangement is made of a non-metallic material, preferably of a diffusion-tight plastic or of a plastic having a diffusion-tight coating. The plastic does not interfere with the interaction between the magnetic plate and the induction coil in response to the coupling of the induction coil to an external induction coil, so that the charging capacity is maintained. Due to the diffusion-tight plastic or, alternatively, due to the plastic having the diffusion coating, a diffusion of the cooling fluid into the induction coil as well as into further components of the charging arrangement, which are connected in an electrically conductive manner, is prevented. An efficient cooling of the induction charging device can be attained in this way and an electrical as well as a mechanical damage to the induction charging device can be prevented. So as not to also negatively influence the electromagnetic field generated by the induction coil by means of the cooling fluid, a non-conductive or only slightly conductive cooling fluid can be used. As a whole, the cooling arrangement can be arranged for example on the induction coil and on the magnetic plate over a large area in the case of this arrangement, and the charging arrangement can thus be cooled efficiently without reducing the charging capacity of the induction charging device.

It is alternatively or additionally provided that the cooling arrangement is arranged with the cooling bottom side on a magnetic plate top side of the magnetic plate. In the case of this embodiment of the cooling arrangement, the interaction of the magnetic plate with the induction coil is not influenced in response to the coupling of the induction coil to an external induction coil, so that the cooling arrangement can be arranged on the magnetic plate in some areas or over a large area. The cooling arrangement can additionally be made of any material.

It is advantageously provided that the cooling arrangement is made of a metal, preferably of aluminum, or of a metallic alloy, preferably of an aluminum alloy. Metals and some metal alloys have a relatively high heat conductivity, so that the heat transfer between the cooler cooling fluid and the hotter elements to be cooled of the charging arrangement, can be increased in an advantageous manner.

It is provided in the case of a further development of the solution according to the invention that the cooling arrangement is arranged with the cooling top side on a housing bottom side and/or on a coil bottom side. In the case of this embodiment of the charging arrangement, the cooling arrangement can also abut on the induction coil and/or on the housing bottom side in some areas or over a large area. So as not to negatively influence the interaction of the induction coil with an external induction coil in response to the coupling, the cooling arrangement can be made of a non-metallic material. The non-metallic material is preferably a diffusion-tight plastic or a plastic having a diffusion-tight coating. In the case of this embodiment of the charging arrangement, a non-conductive or an only slightly conductive cooling fluid can also be used To be able to arrange the individual elements to be cooled in the charging arrangement, it is advantageously provided that on a housing top side, the charging housing has at least one coil recess for the at least one induction coil and/or at least one magnetic plate recess for the magnetic plate, and/or on a housing bottom side has at least one cooling recess for the cooling arrangement. The induction coil, the magnetic plate or also the cooling arrangement can be secured in the charging housing in a space-saving manner in this way. An abutment of the individual elements to be cooled of the charging arrangement against one another is additionally made possible over a large area, so that the heat transfer between the cooling arrangement and the individual elements to be cooled of the charging arrangement is improved.

It is advantageously provided that the cooling arrangement has at least one cooling duct, which is formed integrally in the cooling recess of the charging housing, and that the charging arrangement has a bottom side cover, which is secured in a fluid-tight manner to the housing bottom side of the charging housing. The cooling arrangement is thus formed by the housing bottom side and the bottom side cover, which abuts in a fluid-tight manner on the housing bottom side. The cooling fluid flows through the cooling duct, so that the charging housing is cooled directly. The efficiency of the cooling arrangement can be significantly improved in this way. The fluid-tight securing of the bottom side cover to the housing bottom side can be attained, for example, by means of an adhesive bond. A sealant—for example an elastic material, such as rubber—can alternatively also be used in combination with a screw connection or a clamping connection.

So as also not to negatively influence the interaction of the induction coil with an external induction coil in response to the coupling here, it is advantageously provided that the charging housing and/or the bottom side cover are made of a non-metallic material, preferably of a diffusion-tight plastic or of a plastic having a diffusion-tight coating. The cooling duct can then for example be milled on the housing bottom side or the charging housing comprising the integrally embodied cooling duct can alternatively be produced in an injection molding process.

The cooling arrangement can advantageously have a pipe arrangement comprising at least one cooling fluid pipe. The pipe arrangement can thereby have a plurality of cooling fluid pipes, through which the cooling fluid can flow and which are connected, for example, by means of a cooling fluid collector.

The cooling arrangement can alternatively or additionally have a disk arrangement comprising at least one cooling disk comprising at least one cooling duct. The cooling ducts can thereby for example by molded by a forming of the cooling disk or can be designed to be open. The cooling ducts can thus be molded of a metal or of a plastic, for example by means of a deep-drawing of the cooling disk. To close the open cooling ducts, the disk arrangement can be secured in a fluid-tight manner, for example, to the magnetic plate, to the charging housing cover or to a housing bottom side of the charging housing. The cooling arrangement can alternatively have a cooling housing, in which the disk arrangement is secured in a fluid-tight manner.

Alternatively or additionally, the cooling arrangement can also have a duct arrangement comprising at least one duct plate comprising a cooling duct, which is integrally molded in the duct plate. The duct plate can, for example, be metallic or non-metallic, and the cooling ducts can be formed, for example, by means of a milling in the duct plate. Surfaces of the individual elements to be cooled of the charging arrangement, such as, for example, the charging housing cover or the magnetic plate or the charging housing, can advantageously also serve as duct plate. The duct arrangement provides for a particularly space-saving securing of the cooling arrangement in the charging arrangement.

To increase the heat transfer between the cooling arrangement and the individual elements to be cooled of the charging arrangement, it is advantageously provided that the charging housing is at least partially filled with a temperature-stable and/or heat conductive and/or electrically insulating heat dissipation filling. The heat dissipation filling can be, for example, a heat conducting paste or a casting compound, which is cast into the charging housing and is solidified by means of a heat supply. The elements to be cooled of the charging arrangement can be secured to one another by means of the heat dissipation filling, so that the heat transfer between the individual elements to be cooled among one another as well as with the cooling arrangement is improved. The elements of the charging arrangement, which do not abut directly on the cooling arrangement, can also be cooled effectively in this way. The electrically insulating heat dissipation filling can be used in an advantageous manner in particular in the case of the metallic cooling arrangement.

It is advantageously provided that the charging arrangement has a heat conducting layer, which abuts on a cover top side of a charging housing cover and on a metal plate bottom side of the metal shield plate. The heat conducting layer can be a heat conducting plate, a heat conducting film or a heat conducting paste. The metal shield plate of the emission protection arrangement can also be connected in a heat-conducting manner to the charging arrangement and thus to the cooling arrangement in this way and can be actively cooled. A securing of the heat conducting layer can thereby take place by means of a substance-to-substance bond, in a non-positive or also in a positive manner.

In the case of an advantageous further development of the induction charging device according to the invention, it is provided that the induction charging device has a power electronic unit, which is secured in a heat-conducting manner in the charging arrangement or on the charging arrangement or on the metal shield plate. The power electronic unit includes a plurality of electrical heat-generating components, which can be cooled in this way by means of the cooling arrangement.

To be able to secure the induction charging device to the motor vehicle in a space-saving manner, it is advantageously provided that the induction charging device is molded to be essentially flat or essentially follows a three-dimensional surface. The induction charging device, which is molded to be flat, can thus for example be secured to a motor vehicle floor, and the induction coil of the induction charging device can be coupled to an external induction coil by approaching a flat charging point. Alternatively, the induction charging device can essentially follow the three-dimensional surface and can for example be adapted to the shape of the motor vehicle floor. In the case of this embodiment, the induction charging device can be arranged in a space-saving manner on the motor vehicle floor, and an unwanted breakaway of the induction charging device as a result of a motor vehicle use can be avoided.

As a whole, the induction charging device can be actively cooled by means of the active cooling arrangement, whereby the charging capacity is increased and an overheating of the induction charging device is avoided.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
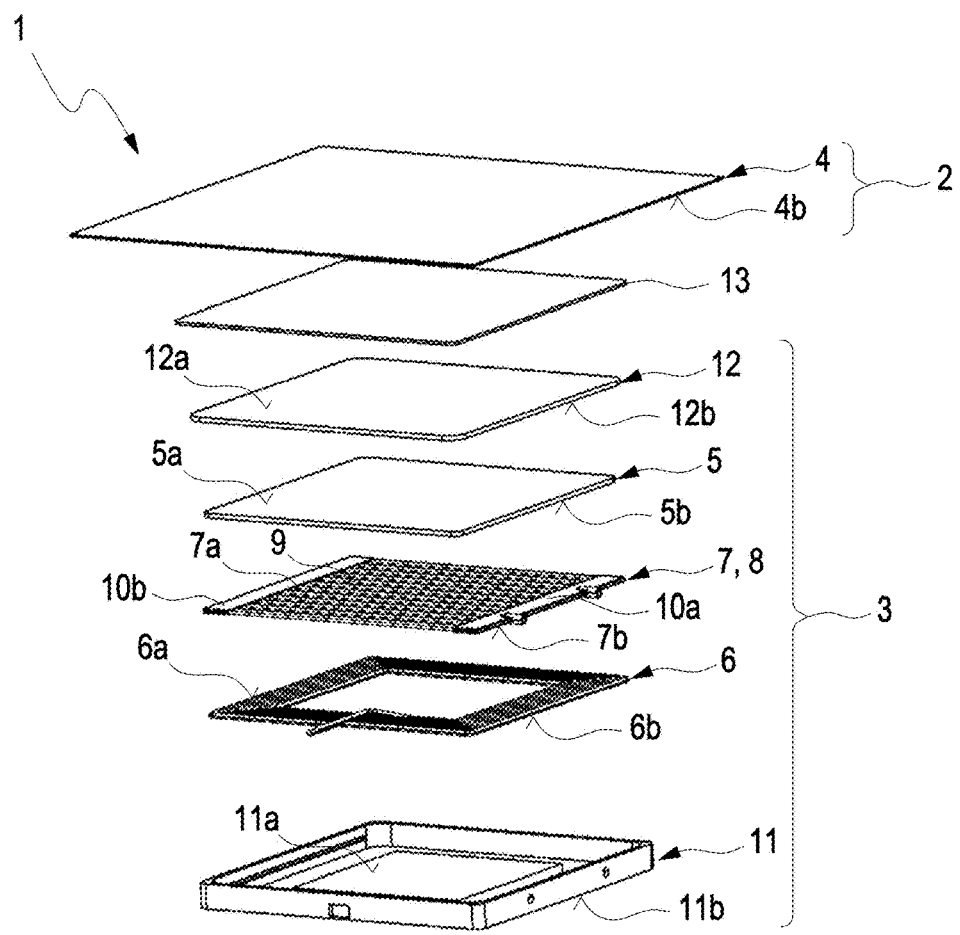
FIG. 1 shows an exploded view of an induction charging device according to the invention in a first embodiment.
Figure 2:
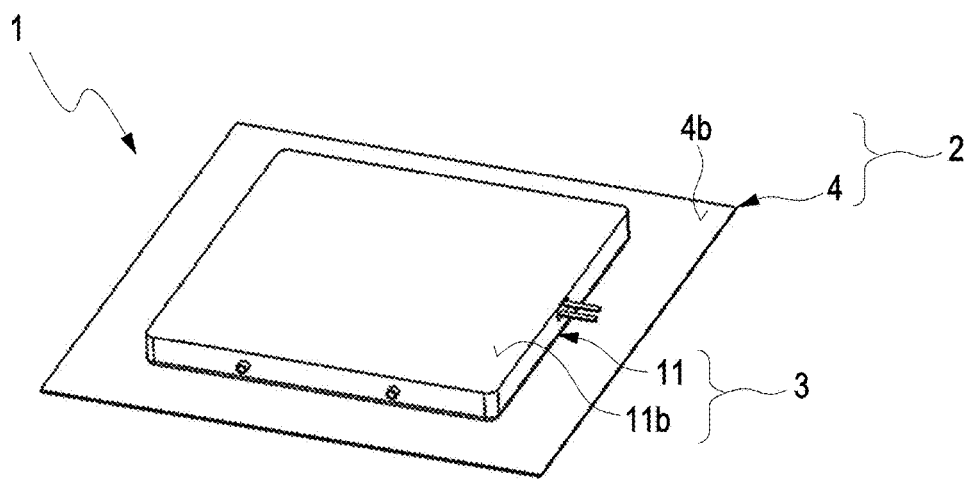
FIG. 2 shows a view of the induction charging device show in FIG. 1.

FIG. 1 and FIG. 2 show an exploded view and a schematic view of an induction charging device 1 according to the invention. The induction charging device 1 has an emission protection arrangement 2 and a charging arrangement 3. The emission protection arrangement 2 comprises a metal shield plate 4, which shields the electromagnetic field emission of the charging arrangement 3 towards a motor vehicle. The metal shield plate 4 can be made, for example, of aluminum or of an aluminum alloy. The charging arrangement 3 has an at least partially ferrimagnetic or ferromagnetic magnetic plate 5, an induction coil 6, and an active cooling arrangement 7.

The induction coil 6 is embodied in an exemplary manner in the form of a circular coil here and can be electromagnetically coupled to an external induction coil. In this exemplary embodiment, the cooling arrangement 7 is a pipe arrangement 8 comprising a plurality of cooling fluid pipes 9, which are connected to one another on both sides by means of cooling fluid collectors 10a and 10b. The cooling arrangement 7 is arranged with a cooling top side 7a on a magnetic plate bottom side 5b of the magnetic plate 5 and with a cooling bottom side 7b on a coil top side 6a of the induction coil 6 in a heat-conducting manner. An overheating of the induction coil 6 and of the magnetic plate 5 can thus be prevented in an advantageous manner thereby. So as not to negatively influence the field guidance of the magnetic plate 5 and of the induction coil 6, the cooling arrangement 7 can be made of a non-metallic material. A non-conductive or an only slightly conductive cooling fluid can additionally also be used in the cooling arrangement 7. The magnetic plate 5, the induction coil 6, and the cooling arrangement 7 are arranged in a charging housing 11, which is closed by means of a charging housing cover 12. The induction coil 6 thereby abuts with a coil bottom side 6b on a housing top side 11a.

The emission protection arrangement 2 and the charging arrangement 3 are connected to one another by means of a heat conducting layer 13—for example a heat conducting plate, a heat conducting film or a heat conducting paste— which abuts on a cover top side 12a of the charging housing cover 12 and on a metal plate bottom side 4b of the metal shield plate 4. In this way, the metal shield plate 4 of the emission protection arrangement 2 is connected in a heat-conducting manner to the charging arrangement 3 and thus to the cooling arrangement 7, and is actively cooled. To improve the heat transfer between the metal shield plate 5, the induction coil 6, and the cooling arrangement 7, the charging housing 11 can be filled at least partially with a temperature-stable and/or heat conductive and/or electrically insulating heat dissipation filling—for example a heat conducting paste or a casting compound.

Figure 3:
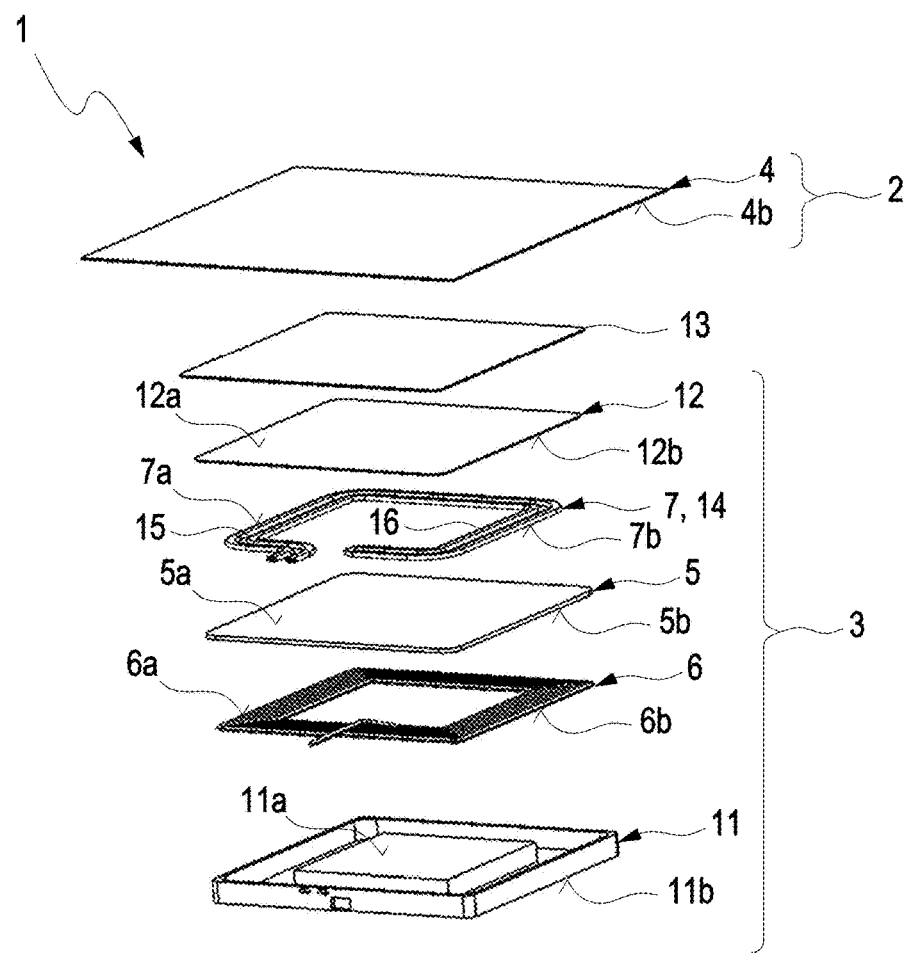
FIG. 3 shows an exploded view of an induction charging device according to the invention in a second embodiment.
Figure 4:
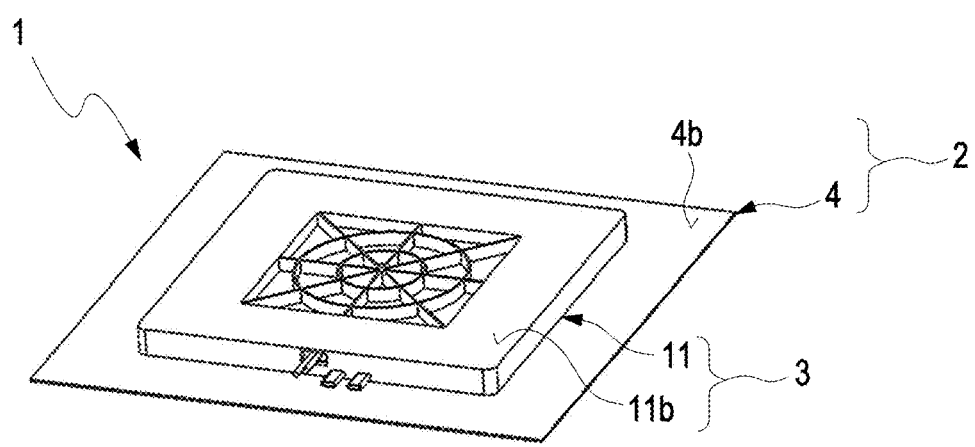
FIG. 4 shows a view of the induction charging device shown in FIG. 3.

FIG. 3 and FIG. 4 show an exploded view and a schematic view of the induction charging device 1 according to the invention. In this exemplary embodiment, the cooling arrangement 7 is arranged with the cooling bottom side 7b on a magnetic plate top side 5a of the magnetic plate 5—for example a ferrite plate. In the induction charging device 1, the cooling arrangement 7 does not influences the field guidance of the magnetic plate 5 with the induction coil 6, so that the cooling arrangement 7 can be made of any material. Here, the cooling arrangement 7 is a disk arrangement 14 comprising a cooling disk 15. A plurality of cooling ducts 16 are molded on the cooling disk 15, and the cooling disk 15 is secured in a fluid-tight manner to the magnetic plate bottom side 5b. The disk arrangement 14 can alternatively be in the form of a pipe disk arrangement comprising a plurality of pipes or a duct disk arrangement comprising a plurality of closed cooling ducts, which are molded integrally in the duct disk arrangement.

Figure 5:
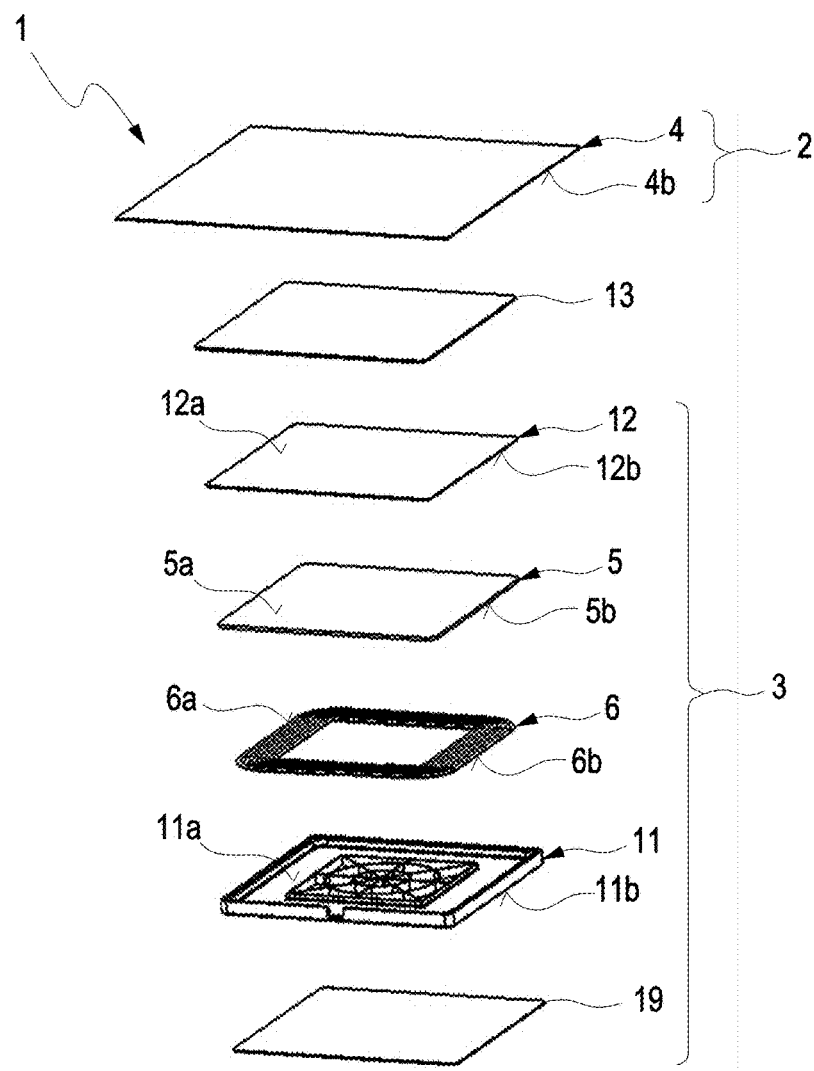
FIG. 5 shows an exploded view of an induction charging device according to the invention in a third embodiment.
Figure 6:
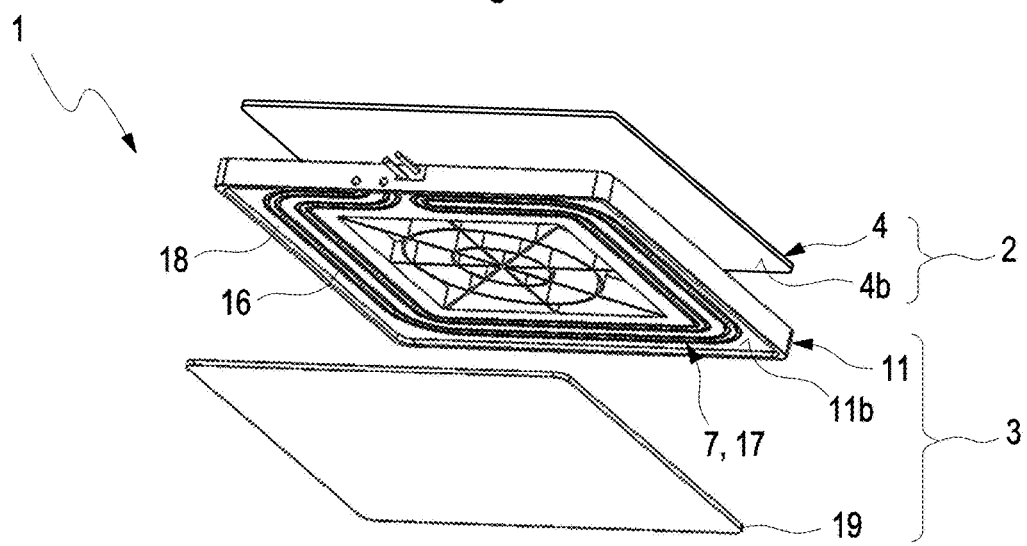
FIG. 6 shows a view of the induction charging device shown in FIG. 5.

FIG. 5 and FIG. 6 show an exploded view and a schematic view of the induction charging device 1 according to the invention. In this exemplary embodiment, the cooling arrangement 7 is arranged with the cooling top side 7a on a housing bottom side 11b. Here, the cooling arrangement 7 is a duct arrangement 17 comprising the cooling ducts 16. The cooling ducts 16 are molded integrally in a cooling recess 18 on the housing bottom side 11b of the charging housing 11 and are separated in a fluid-tight manner by means of a bottom side cover 19. The duct arrangement 17 is thus formed by means of the housing bottom side 11b and the bottom side cover 19, which abuts in a fluid-tight manner on the housing bottom side 11b. So as not to negatively influence the interaction of the induction coil 6 with an external induction coil, the charging housing 11 and the bottom side cover 19 can be made of a non-metallic material. The cooling fluid can furthermore also be non-conductive.

In the exemplary embodiments illustrated here, the induction charging device 1 is molded so as to be flat. However, the induction charging device 1 can also essentially follow a three-dimensional surface, in order to be able to secure the induction charging device 1 in a space-saving manner for example to an uneven motor vehicle floor.

As a whole, the induction charging device 1 according to the invention can be actively cooled by means of the cooling arrangement 7, and the charging capacity can be increased thereby, and an overheating of the induction charging device 1 can be prevented. In the case of a constant charging capacity, the dimensions of the induction coil 6 can alternatively be decreased in the induction charging device 1 according to the invention, and the total mass, the dimensions, as well as the costs of the induction charging device 1 can be reduced thereby.

The invention claimed is:

1. An induction charging device for a partially or fully electrically operated motor vehicle, comprising:
   an emission protection arrangement including a metal shield plate;
   a charging arrangement secured to the emission protection arrangement;
   the charging arrangement including a magnetic plate facing the emission protection arrangement, wherein the magnetic plate is at least one of (i) at least partially ferrimagnetic and (ii) at least partially ferromagnetic;
   the charging arrangement further including at least one induction coil disposed in a charging housing;
   the charging arrangement further including an active cooling arrangement secured in the charging housing to transfer heat;
   on a housing bottom side, the charging housing including at least one cooling recess for the active cooling arrangement;
   the active cooling arrangement including at least one cooling duct formed integrally in the at least one cooling recess of the charging housing; and
   wherein the charging arrangement further includes a bottom side cover secured in a fluid-tight manner to the housing bottom side of the charging housing.

2. The induction charging device according to claim 1, wherein, on a housing top side, the charging housing further includes at least one of:
   at least one coil recess for the at least one induction coil; and
   at least one magnetic plate recess for the magnetic plate.

3. The induction charging device according to claim 1, wherein, on a housing top side, the charging housing further includes at least one coil recess for the at least one induction coil.

4. The induction charging device according to claim 1, wherein, on a housing top side, the charging housing further includes at least one magnetic plate recess for the magnetic plate.

5. The induction charging device according to claim 1, wherein at least one of the charging housing and the bottom side cover are composed of a non-metallic material.

6. The induction charging device according to claim 5, wherein the non-metallic material is a diffusion-tight plastic.

7. The induction charging device according to claim 5, wherein the non-metallic material is a plastic including a diffusion-tight coating.

8. The induction charging device according to claim 1, wherein the charging housing is at least partially filled with at least one of:
- a temperature-stable heat dissipation filling;
- a heat conductive heat dissipation filling; and
- an electrically insulating heat dissipation filling.

9. The induction charging device according to claim 1, wherein the charging housing is at least partially filled with a temperature-stable heat dissipation filling.

10. The induction charging device according to claim 1, wherein the charging housing is at least partially filled with a heat conductive heat dissipation filling.

11. The induction charging device according to claim 1, wherein the charging housing is at least partially filled with an electrically insulating heat dissipation filling.

12. The induction charging device according to claim 1, wherein the charging arrangement further includes a heat conducting layer abutting a cover top side of a charging housing cover and a metal plate bottom side of the metal shield plate.

13. The induction charging device according to claim 12, wherein the heat conducting layer is structured as a heat conducting plate.

14. The induction charging device according to claim 12, wherein the heat conducting layer is structured as a heat conducting film.

15. The induction charging device according to claim 12, wherein the heat conducting layer is structured as a heat conducting paste.

16. The induction charging device according to claim 1, further comprising a power electronic unit secured in a heat-conducting manner at least one of (i) in the charging arrangement, (ii) on the charging arrangement, and (iii) on the metal shield plate.

17. The induction charging device according to claim 16, wherein the charging arrangement further includes a heat conducting layer disposed between and abutting (i) a cover top side of a charging housing cover, and (ii) a metal plate bottom side of the metal shield plate.

18. The induction charging device according to claim 1, wherein the induction charging device is structured at least one of (i) essentially flat and (ii) to essentially follow a three-dimensional surface.

19. An induction charging device for a partially or fully electrically operated motor vehicle, comprising:
- an emission protection arrangement including a metal shield plate;
- a charging arrangement secured to the emission protection arrangement, the charging arrangement including:
  - a magnetic plate facing the emission protection arrangement, wherein the magnetic plate is at least partially ferrimagnetic;
  - at least one induction coil disposed in a charging housing;
  - an active cooling arrangement secured in the charging housing to transfer heat; and
  - a bottom side cover secured in a fluid-tight manner to a housing bottom side of the charging housing;
- the charging housing having at least one cooling recess disposed in the housing bottom side for the active cooling arrangement; and
- wherein the active cooling arrangement includes at least one cooling duct formed integrally in the at least one cooling recess of the charging housing.

20. An induction charging device for a partially or fully electrically operated motor vehicle, comprising:
- an emission protection arrangement including a metal shield plate;
- a charging arrangement secured to the emission protection arrangement, the charging arrangement including:
  - a magnetic plate facing the emission protection arrangement, wherein the magnetic plate is at least partially ferrimagnetic;
  - at least one induction coil disposed in a charging housing;
  - an active cooling arrangement secured in the charging housing to transfer heat; and
  - a bottom side cover secured in a fluid-tight manner to a housing bottom side of the charging housing;
- the charging housing having at least one cooling recess disposed in the housing bottom side for the active cooling arrangement; and
- wherein the active cooling arrangement includes at least one cooling duct formed integrally in the at least one cooling recess of the charging housing.

* * * * *